(12) United States Patent
Reyes

(10) Patent No.: US 11,592,408 B2
(45) Date of Patent: Feb. 28, 2023

(54) THERMAL MEASUREMENT APPARATUS AND METHODS FOR ANISOTROPIC THERMAL MATERIALS

(71) Applicant: National Technology & Engineering Solutions of Sandia, LLC, Albuquerque, NM (US)

(72) Inventor: Karla Rosa Reyes, Livermore, CA (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 17/735,581

(22) Filed: May 3, 2022

(65) Prior Publication Data

US 2022/0260511 A1    Aug. 18, 2022

Related U.S. Application Data

(62) Division of application No. 16/984,894, filed on Aug. 4, 2020, now Pat. No. 11,371,949.

(51) Int. Cl.
*G01N 25/18* (2006.01)
*G01K 13/10* (2006.01)

(52) U.S. Cl.
CPC .................... *G01N 25/18* (2013.01)

(58) Field of Classification Search
CPC ............................. G01N 25/18; G01K 13/10
USPC ......................... 374/120, 179, 44
See application file for complete search history.

(56) References Cited

U.S. PATENT DOCUMENTS

| 7,490,981 B2 * | 2/2009 | Petrovic | G01N 25/18 374/43 |
| 10,041,894 B1 * | 8/2018 | Alam | G01K 17/00 |

FOREIGN PATENT DOCUMENTS

| DE | 102018125943 A1 * | 4/2020 | |
| EP | 3339827 A1 * | 6/2018 | G01K 13/10 |
| FR | 2818739 A1 | 6/2002 | |
| RU | 2535657 C1 * | 12/2014 | G01N 25/18 |
| WO | 0070333 A1 | 11/2000 | |

OTHER PUBLICATIONS

Gustafsson, Silas E., "Transient Plane Source Techniques for Thermal Conductivity and Thermal Diffusivity Measurements of Solid Materials", Review of Scientific Instruments, Mar. 1991, pp. 797-804, vol. 62 No. 3, AIP Publishing.

* cited by examiner

*Primary Examiner* — Mirellys Jagan
(74) *Attorney, Agent, or Firm* — Samantha Updegraff

(57) ABSTRACT

A system for characterizing thermal properties of thermally anisotropic heterogeneous samples includes a heating element, a first temperature sensing device, a second temperature sensing device, and a computing system. The heating element is positioned at a first location within a sample and heats the sample. The first temperature sensing device outputs data indicative of temperatures of the first location to the computing device. The second temperature sensing device outputs data indicative of temperatures of the second location to the computing device. The computing device computes a thermal conductivity of the sample based upon the temperatures of the first location. The computing device further outputs an indication of a portion of the sample to which the thermal conductivity pertains based upon the second temperatures.

10 Claims, 8 Drawing Sheets

THERMAL MEASUREMENT APPARATUS AND METHODS FOR ANISOTROPIC THERMAL MATERIALS

CROSS-REFERENCE TO RELATED APPLICATION

This is a divisional application of U.S. application Ser. No. 16/984,894, filed Aug. 4, 2020, which is incorporated herein by reference.

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

Electronic components and other devices are commonly embedded in, surrounded by, or potted with barrier materials to provide thermal dissipation, electrical or thermal insulation, or mechanical shock resistance to the embedded device. In some applications, it may be desirable or necessary to incorporate the benefits of multiple different types of materials into a barrier. By way of example, it may be desirable to pot an aircraft-mounted electronic device with a first material that provides thermal dissipation of waste heat from the electronic device, and to further surround the potted device with a second material that provides mechanical shock resistance. However, it is generally not straightforward to determine the thermal characteristics of a barrier that includes multiple materials. For instance, while it may be possible to determine a thermal conductivity of a material layer in isolation, it is generally difficult to determine a thermal conductivity of a barrier that includes multiple layers.

SUMMARY

The following is a brief summary of subject matter that is described in greater detail herein. This summary is not intended to be limiting as to the scope of the claims.

Various technologies pertaining to characterization and measurement of thermal characteristics of heterogeneous sample elements are described herein. A heterogeneous sample can include multiple layers, wherein each layer has different thermal characteristics. By way of example, a sample can include a first layer composed of a first material, a second layer composed of a second material, a third layer composed of a third material, etc. Conventionally, for both thermally isotropic and anisotropic materials, the time that a heat wave takes to penetrate a sample in a single direction (e.g., through its thickness, along its length, or along its width) is substantially constant through the sample. However, for heterogeneous anisotropic samples (e.g., layered samples), the time that a heat wave takes to penetrate the sample can be variable along a single direction. Accordingly, an apparent thermal conductivity of a heterogeneous anisotropic sample is time dependent.

An exemplary system for characterizing a thermal conductivity of a heterogenous anisotropic sample includes a heating device, a first temperature sensing device, a second temperature sensing device, and a computing system. The heating device is configured to heat the sample at a first location. The first temperature measurement device is configured to output an indication of a temperature of the sample at the first location at each of a plurality of times. In exemplary embodiments, the heating device and the first temperature sensing device are embodied by a same transient plane source (TPS). By way of example, the TPS can comprise an electrically conductive element that is positioned at the first location within the sample. An electrical current can be caused to flow from a first terminal of the element to a second terminal of the element. Further, an electrical characteristic of the conductive element is indicative of a temperature of the element and the sample in a region about the conductive element (e.g., the first location). In a non-limiting example, a resistance between the first terminal and the second terminal of the electrically conductive element can be indicative of the temperature of the sample at the first location.

The computing system can log a temperature of the first location of the sample at each of a plurality of times during a period of time. For example, the computing system can be configured to receive measurements of the resistance between the terminals of the TPS and to compute temperatures based upon these measurements. The computing system is further configured to determine a thermal conductivity value of the sample based upon the computed temperatures and known geometric and electrical parameters of the TPS.

Whereas the computing system can be configured to determine a thermal conductivity value, it is not known a priori to which portion of the sample a computed thermal conductivity value pertains. The second temperature sensing device can be configured to output an indication of a temperature of a second location in the sample at one or more times in the same period of time as the measurements of the temperature of the first location were taken. The computing device can determine, based upon output of the second temperature sensing device, a temperature of the second location at the one or more times. Based upon the determined temperature of the second location, the computing device can output an indication of a portion of the sample to which the thermal conductivity value pertains. By way of example, and not limitation, the computing system can indicate that a layer of the sample that includes the second location is a layer of which the thermal conductivity is representative, based upon the temperature of the second location exceeding a threshold value.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
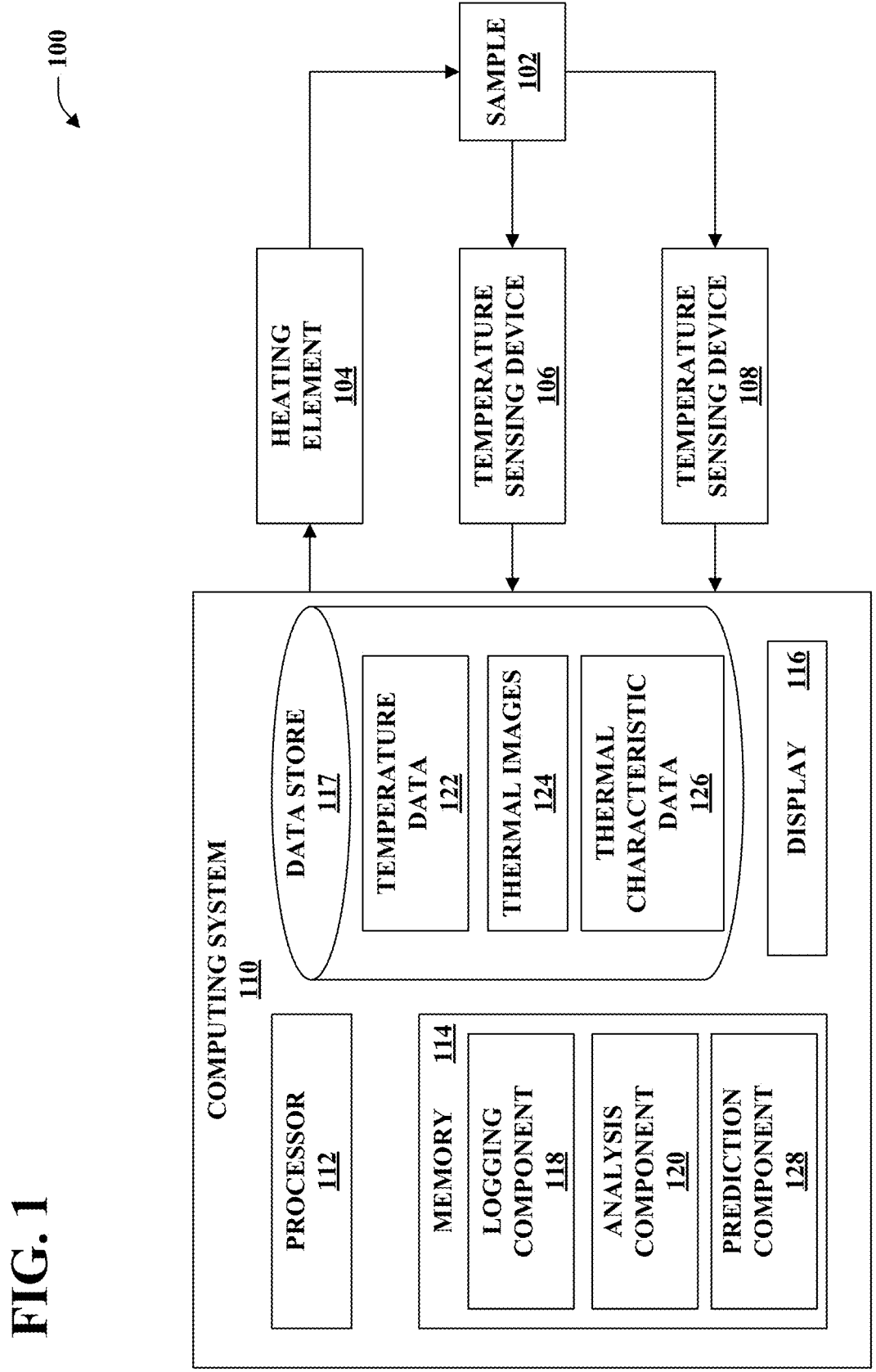
FIG. 1 is a functional block diagram of an exemplary system that facilitates measuring thermal conductivity values for heterogeneous anisotropic barriers.

Various technologies pertaining to measurement of thermal properties of heterogeneous barriers are now described with reference to the drawings, wherein like reference numerals are used to refer to like elements throughout. With more specificity, technologies that facilitate determining a thermal conductivity of one or more portions of a heterogeneous thermally anisotropic barrier are described herein. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary" is intended to mean serving as an illustration or example of something, and is not intended to indicate a preference.

With reference to FIG. 1, an exemplary system 100 that facilitates computing a thermal conductivity of a heterogeneous sample is illustrated. The system 100 includes a sample 102 the thermal properties of which are desirably characterized. The system 100 further includes a heating element 104, a first temperature sensing device 106, a second temperature sensing device 108, and a computing system 110. The computing system 110 includes a processor 112, memory 114 that includes instructions that are executed by the processor 112, a display 116, and a data store 117.

The sample 102 is a heterogeneous sample in that the sample 102 is non-uniform in its mechanical construction or its material composition. For instance, the sample 102 can be a layered element comprised by a first layer and a second layer, wherein the first layer and the second layer have different material composition. In another example, the sample 102 can have a physical property that is continuously variable along a dimension of the sample 102. By way of example, and not limitation, the sample 102 can have a porosity that varies along a thickness of the sample 102. By virtue of its non-uniformity, the sample 102 is thermally anisotropic. Stated differently, the sample 102 has a first thermal conductivity in a first direction and a second thermal conductivity in at least one other direction. A multi-layer sample, for instance, can have a first thermal conductivity along an x-y plane that lies within a single layer (e.g., parallel with a length and width of the multi-layer sample), whereas the multi-layer sample can have a second thermal conductivity in a z-direction that extends through multiple layers (e.g., along a thickness of the multi-layer sample).

The system 100 is configured to determine a thermal conductivity of the sample 102 based upon observed temperature changes of the sample 102 over time during heating of the sample 102. The heating element 104 is configured to heat the sample 102. The temperature sensing devices 106, 108 are configured to output data or signals indicative of temperature of the sample 102 at respective locations in the sample 102 during heating of the sample by the heating element 104. By way of example, the first temperature sensing device 106 outputs data or signals indicative of first temperatures of the sample 102 at a first location in the sample 102. Continuing the example, the second temperature sensing device 108 outputs data or signals indicative of second temperatures of the sample 102 at a second location in the sample 102. The computing system 110 is configured to control operation of the heating element 104 and to receive temperature data or signals from the temperature sensing devices 106, 108. The memory 114 includes a logging component 118 that logs temperatures of the sample 102 over time based upon output of the temperature sensing devices 106, 108. The memory 114 further includes an analysis component 120 that is configured to compute, based upon the temperatures, a thermal conductivity of the sample 102. For example, the analysis component 120 can compute a thermal conductivity of the sample 102 based upon output of the first temperature sensing device 106 over a period of time based upon TPS methods, as described in greater detail below. Whereas a thermal conductivity of an element can be computed based on TPS heating, these methods have not previously been robust to non-homogeneous materials, as it cannot be determined from these TPS methods alone to which portion of a sample a conductivity value pertains.

Accordingly, the analysis component 120 is configured to determine, based upon output of the second temperature sensing device 108, a portion of the sample 102 to which the thermal conductivity value pertains. As noted above, the second temperature sensing device 108 outputs data indicative of second temperatures of the sample 102 at a second location in the sample 102 that is different from the first location of the first temperature sensing device 106. Based upon the second temperatures, the analysis component 120 can determine a portion of the sample 102 to which the computed thermal conductivity pertains.

Figure 2:
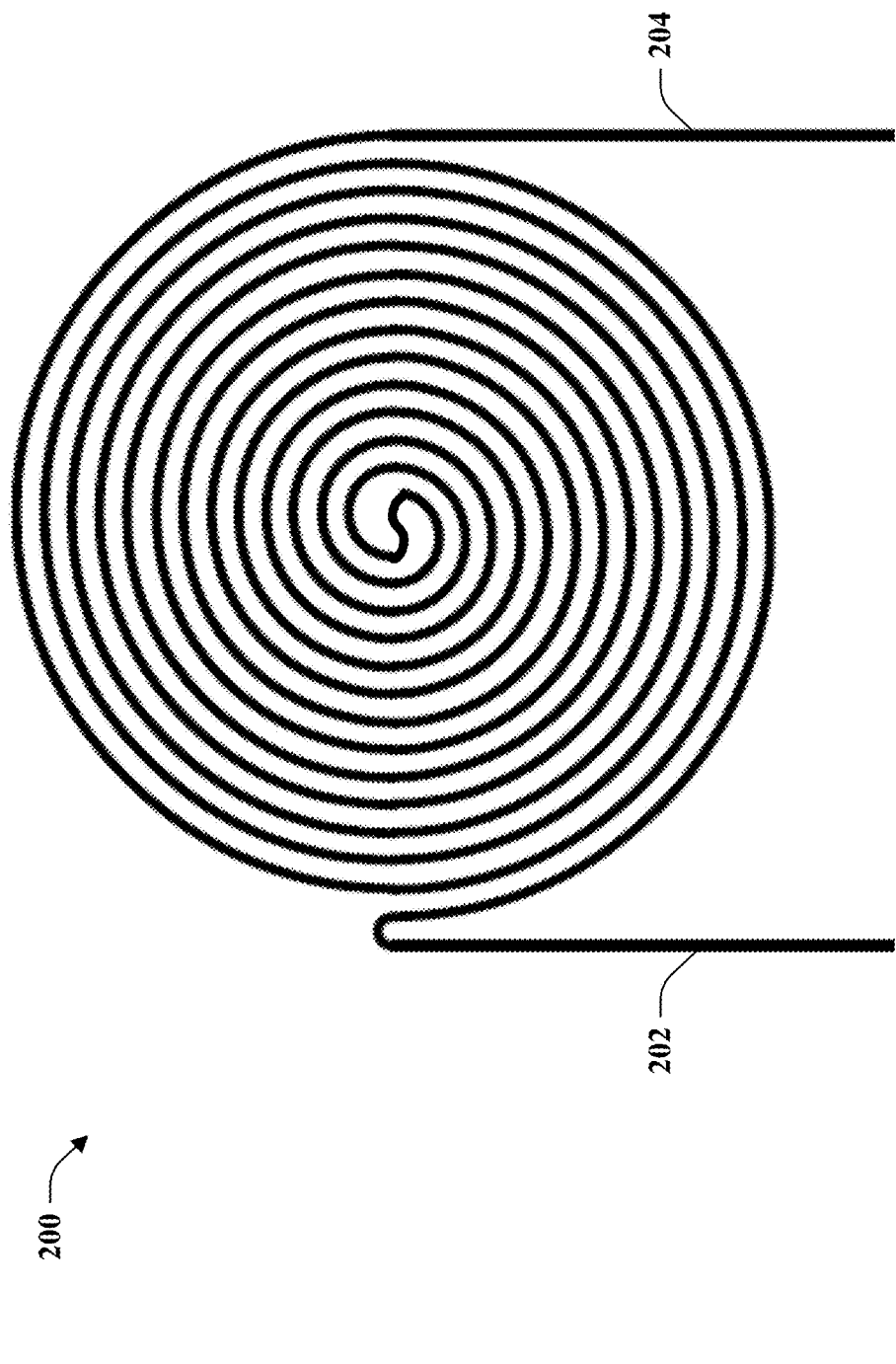
FIG. 2 is a diagram of an exemplary transient plane source element.

Various exemplary aspects of the system 100 are now set forth in greater detail. In various embodiments, the heating element 104 is a resistive heating element that is heated by passing an electric current through an electrically conductive element. By way of example, and referring now to FIG. 2, an exemplary resistive heating element 200 is shown. The heating element 200 is formed from an electrically conductive material and has a first terminal 202 and a second terminal 204. The heating element 200 has a double spiral configuration, and when heated can be thermally modeled as a substantially uniform disk or as a series of concentric rings. The heating element 200 is heated by passing an electric current through the terminals 202, 204.

Referring again to FIG. 1, the heating element 104 and the temperature sensing device 106 are depicted in FIG. 1 as distinct components. For example, the heating element 104 can be a resistive heating element in contact with the sample, and the first temperature sensing device 106 can be a thermocouple that is embedded in or otherwise in contact with a portion of the sample 102. However, the heating element 104 and the first temperature sensing device 106 can be embodied as a same device. For instance, the heating element 200 can be used to heat the sample 102, and the heating element 200 can further be employed as the first temperature sensing device 106. The heating element 200 can be constructed such that an electrical characteristic of the heating element 200 is indicative of a temperature of the heating element 200. By way of example, and not limitation, a resistance between the first terminal 202 and the second terminal 204 can be indicative of a temperature of the heating element 200. The computing device 110 can be configured to receive measurements of a resistance between terminals of the heating element 104 and to compute an associated temperature for each of the resistance measurements, wherein the computed temperatures are indicative of a temperature of the sample 102 at a location of the heating element 104 in the sample 102.

Figure 3:
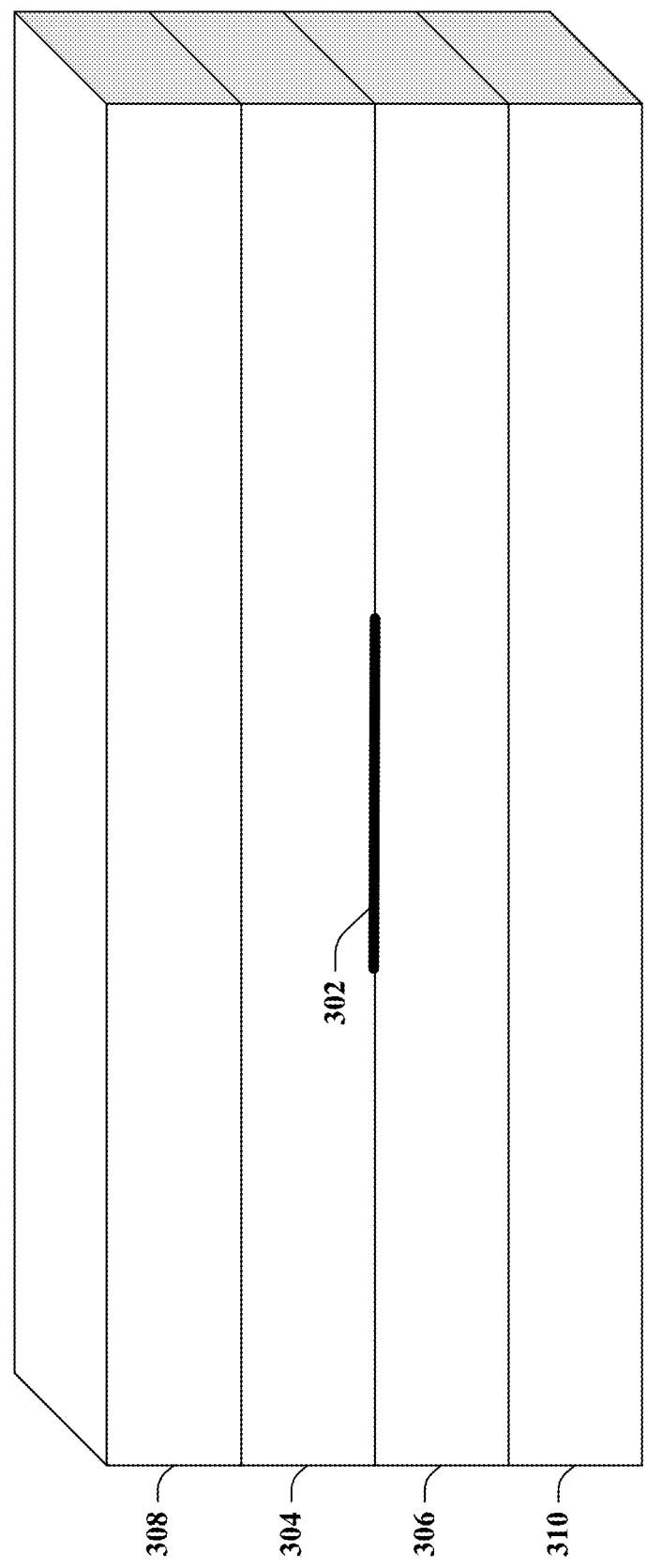
FIG. 3 is a diagram of an exemplary heterogeneous sample.

To facilitate computational modeling of heating of the sample 102 by the heating element 104, the heating element 104 can be positioned such that it is sandwiched between layers of the sample 102. In an illustrative example, and referring now to FIG. 3, an exemplary sample 300 is shown wherein a TPS heating element 302 is sandwiched between layers of the sample 300. The sample 300 includes a first layer 304, a second layer 306, a third layer 308, and a fourth layer 310. The first layer 304 and the second layer 306 are positioned proximal to and in contact with the TPS heating element 302. Further, the first layer 304 and the second layer 306 are composed of a same material and are of substantially similar construction. The third layer 308 is positioned in contact with the first layer 304 such that a substantially planar surface of the first layer 304 makes contact with a substantially planar surface of the second layer 308. Similarly, the fourth layer 310 is positioned in contact with the second layer 306 such that a substantially planar surface of the fourth layer 310 makes contact with a substantially planar surface of the second layer 306.

It is to be understood that the sample 300 is mirrored about the heating element 302 such that on either side of the TPS heating element 302, heat emitted by the TPS heating element 302 travels through layers of same composition and construction in a same order. In other words, heat traveling either upward or downward from the heating element 302 is initially conducted by the first and second layers 304, 306 that have a same first composition and substantially similar first construction, prior to being conducted by the third and fourth layers 308, 310, which have a same second composition and substantially similar second construction that are different from the first composition and construction. Thus, the four-layer arrangement of the sample 300 and the heating element 302 is suited for thermal characterization of a two-layer barrier composed of either the first and third layers 304, 308 or the second and fourth layers 306, 310. By way of further illustration, in connection with characterizing a three-layer thermal barrier, the sample 102 of the system 100 can be a six-layer sample.

Figure 4:
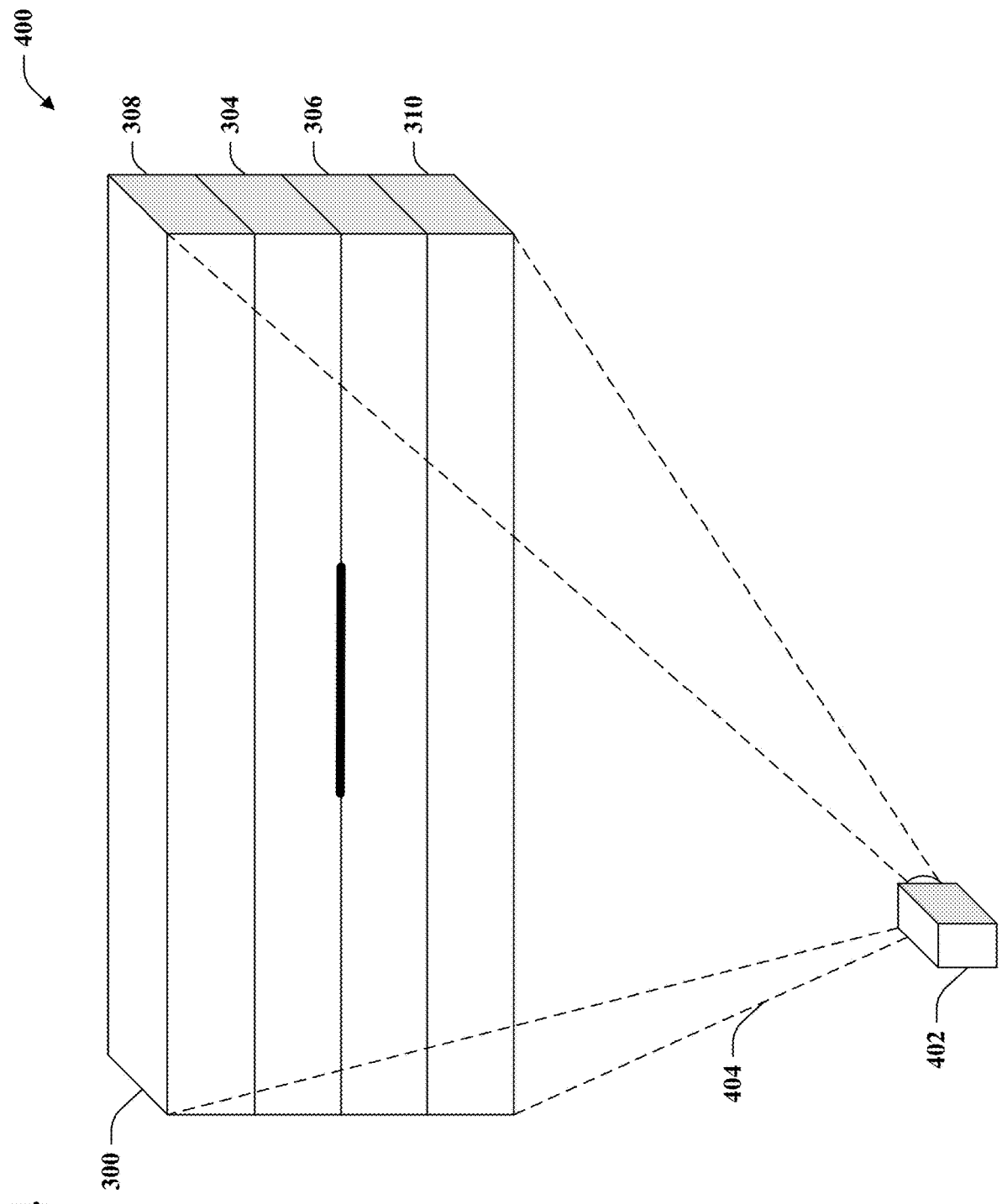
FIG. 4 is an illustration of an exemplary configuration of a thermal camera for capturing thermal images of a sample.

The second temperature sensing device 108 can be or include a thermal camera that is configured to generate thermal images of the sample 102 and to output the thermal images to the computing system 110. By way of example, and referring to FIG. 4, a perspective view 400 of the sample 300 and a thermal camera 402 is shown, wherein the sample 300 is included in a field of view 404 of the thermal camera 402. The field of view 404 includes a side view of the sample 300 such that the layers 304-310 are depicted in thermal images generated by the thermal camera 402.

Figure 5:
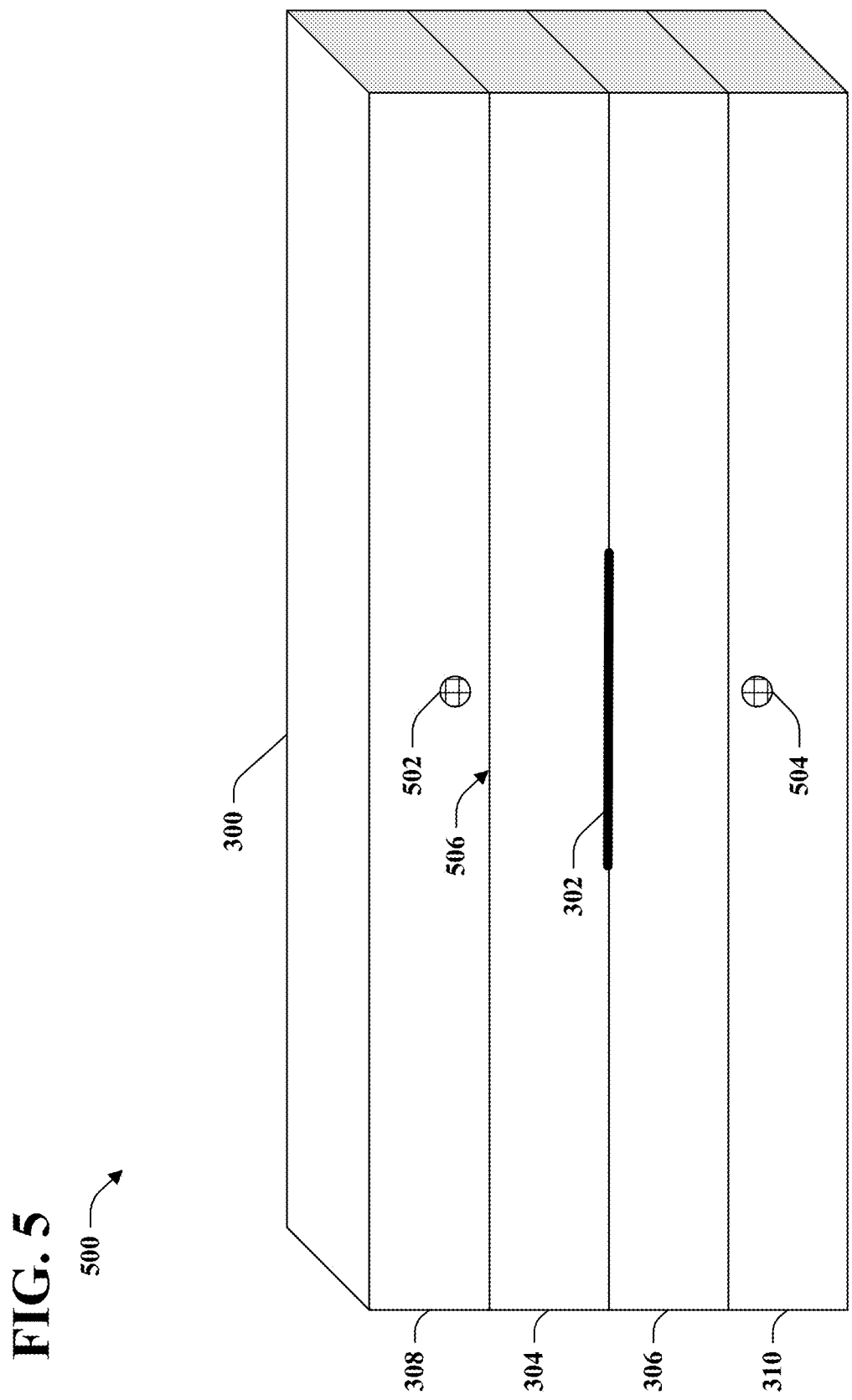
FIG. 5 is an illustration of an exemplary arrangement of temperature sensing devices and a heating element for determining a thermal conductivity of a heterogeneous sample.

The second temperature sensing device 108 can alternatively be or include one or more thermocouples positioned at locations throughout the sample 102. Referring now to FIG. 5, a perspective view 500 of the exemplary sample 300 is shown wherein a first thermocouple 502 and a second thermocouple 504 are positioned within the sample 300. In various embodiments, the thermocouples 502, 504 can be placed proximal to (e.g., within 10 mm, within 5 mm, or within 1 mm of) interfaces between layers of the sample 300. By way of example, the thermocouple 502 can be positioned proximal to an interface 506 between the first layer 304 and the third layer 308 of the sample 300. The thermocouples 502, 504 can be positioned proximal to interfaces between layers rather than at the interfaces in order to avoid changing thermal contact resistance between the layers, while maintaining the ability to determine when a heat wave emanating from the heating element 302 reaches a layer.

Operations of the exemplary system 100 are now described with reference to embodiments wherein the heating element 104 and the first temperature sensing device 106 are embodied by a same TPS (e.g., the resistive heating element 200), and the second temperature sensing device 108 is embodied by a thermal camera (e.g., the thermal camera 402). It is to be understood that the scope of the present disclosure is not so-limited. The sample 102 is further referenced in the following description as being a multi-layer sample, although it will be understood by those of skill in the art that the various aspects set forth herein are also applicable to non-layered heterogeneous samples.

In connection with measuring a thermal conductivity of the sample 102, the computing system 110 can control the heating element 104 to begin heating the sample 102. As the heating element 104 heats the sample 102, the logging component 118 receives, from the first temperature sensing device 106, data or signals indicative of a temperature of the sample 102 at a first location within the sample 102 (e.g., the location of the first temperature sensing device 106 and/or the heating element 104). In a non-limiting example, the logging component 118 can receive values of a resistance between two terminals of the heating element 104 over a period of time during which the heating element 104 heats the sample 102. From the received resistances, the logging component 118 computes temperatures of the sample 102 at the location of the heating element 104. The logging component 118 therefore outputs first temperature values that comprise a temperature value for each of a plurality of times in a period of time. These first temperature values are stored in the data store 117 as temperature data 122, and can further be displayed on the display 116 for review by an analyst.

The analysis component 120 is configured to compute a thermal conductivity value of the sample 102 based upon the first temperature values indicated in the temperature data 122. For a double-spiral heating element (e.g., the heating element 200), a thermal conductivity value of the sample 102 can be computed based upon the following equation:

$$\overline{\Delta T(t)} = \frac{P_0}{\pi^{1.5}ak}f(\tau) \quad \text{Eq. 1}$$

where $\overline{\Delta T(t)}$ is the mean temperature change over time, $P_0$ is the power supplied to the heating element 104, a is the radius of the heating element 104, and k is the thermal conductivity of the sample 102. If the double-spiral heating element is modeled as a series of concentric rings, the function $f(\tau)$ can be defined by the equations:

$$f(\tau) = \frac{1}{n^2(n+1)^2}\int_0^\tau \frac{1}{s^2}\sum_{p=1}^{n}\sum_{q=1}^{n}pq \times \exp\left(-\frac{p^2+q^2}{4s^2n^2}\right)I_0\left(\frac{pq}{2s^2n^2}\right)ds \quad \text{Eq. 2}$$

$$\tau = \sqrt{\frac{t\alpha}{a^2}} \quad \text{Eq. 3}$$

where $\alpha$ is the thermal diffusivity of the sample 102, n is a number of concentric rings of the double-spiral heating element, and $I_0$ is a modified Bessel function. If gaps between concentric rings of the double-spiral heating element are small, the heating element 104 can be modeled as a disk and Eq. 2 can instead be written as:

$$f(\tau) = \int_0^\tau d\sigma\sigma^{-2}\int_0^1 vdv\int_0^1 udu \times \exp\left(\frac{-(u^2+v^2)}{4\sigma^2}\right)I_0\left(\frac{uv}{2\sigma^2}\right) \quad \text{Eq. 4}$$

The equations set forth above are suited for modeling a relationship between mean temperature change of the heating element 104 and a thermal conductivity of the sample 102 for various embodiments of the heating element 104 described herein. However, it will be understood by those of skill in the art that other TPS models can be employed to model the relationship between mean temperature change over time and thermal conductivity for other heating element geometries (e.g., a "hot square").

In general, there is a substantially linear relationship between $\overline{\Delta T(t)}$ and $f(\tau)$, wherein the slope of the linear relationship depends on thermal conductivity. If $\overline{\Delta T(t)}$ and $f(\tau)$ are known, thermal conductivity can be computed directly. However, since the thermal diffusivity, $\alpha$, is not known a priori, $f(\tau)$ cannot be directly computed and instead must be evaluated iteratively. The analysis component 120 is configured to iteratively evaluate $f(\tau)$ using different values of the thermal diffusivity $\alpha$. The analysis component 120 can be configured to evaluate $f(\tau)$ based upon Eq. 2. Alternatively, the analysis component 120 can be configured to evaluate $f(\tau)$ based upon Eq. 4, depending upon construction of the heating element 104. The analysis component 120 compares evaluated values of $f(\tau)$ to the known profile of $\overline{\Delta T(t)}$ (e.g., as indicated in the temperature data 122) to compute a value of linear fit between $\overline{\Delta T(t)}$ and $f(\tau)$. The analysis component 120 continues iterative computation of $f(\tau)$ using different $\alpha$ values until a threshold value of linear fit between $\overline{\Delta T(t)}$ and $f(\tau)$ is reached. A value of $f(\tau)$ that has the best linear fit among the iteratively computed values of $f(\tau)$ is then used to calculate the thermal conductivity k.

The analysis component 120 can compute thermal conductivity and thermal diffusivity values with respect to the sample 102 in the manner described above based upon the first temperatures of the first location in the sample 102 (e.g., as indicated by output of the first temperature sensing device 106). However, for a heterogeneous (e.g., multi-layer) sample, it is indeterminate from the first temperature values which portion of the sample 102 has the computed thermal conductivity.

Figure 6A:
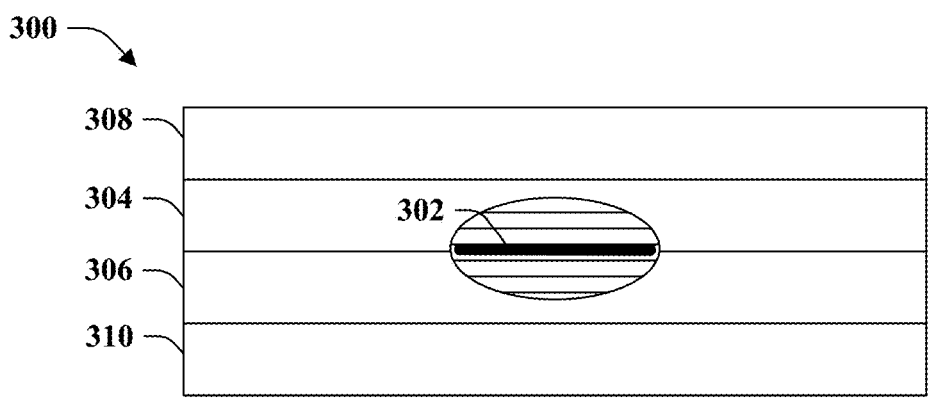
FIGS. 6A-6C depict exemplary thermal images of the sample depicted in FIG. 3.
Figure 6B:
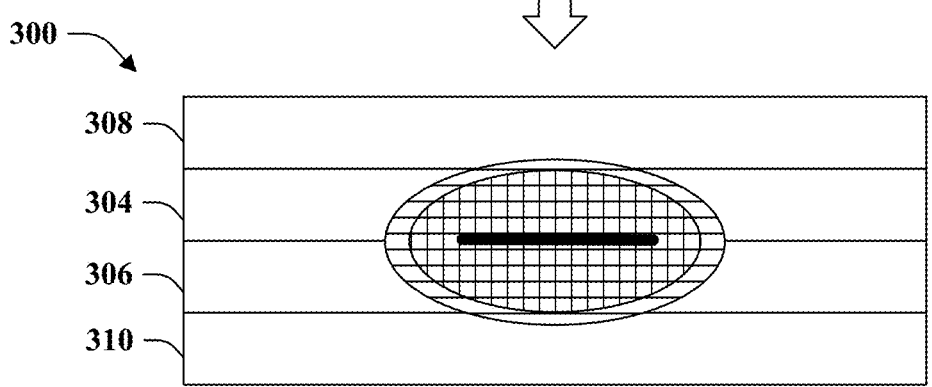
Figure 6C:
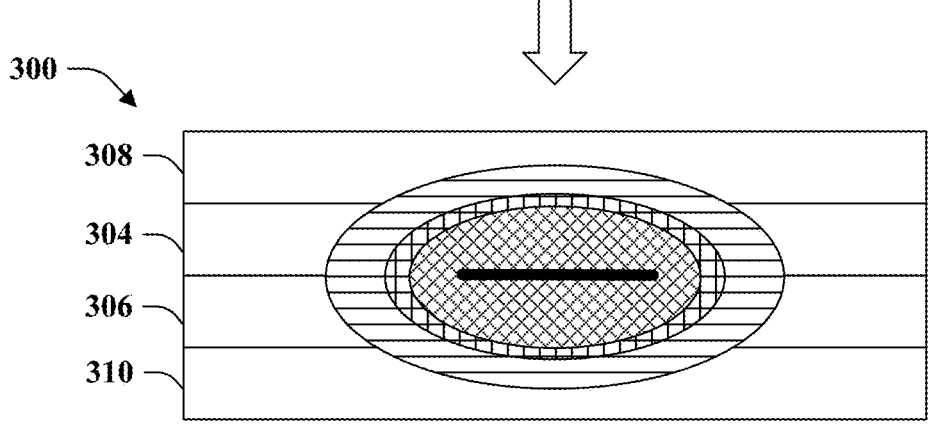

Over the same period of time for which the logging component 118 logs the first temperature values, the logging component 118 can receive, from the second temperature sensing device 108, data or signals indicative of second temperature values of a second location in the sample 102. By way of example, the second temperature sensing device 108 can include a thermal camera that outputs thermal images of the sample. With reference now to FIGS. 6A-6C, a plurality of exemplary thermal images 602-606 of the sample 300 are shown, wherein pixel values of the thermal images 602-606 are indicative of temperatures of different portions of the sample 300. Referring now solely to FIG. 6A, the first thermal image 602 is a thermal image taken at a first time subsequent to the heating element 302 beginning to heat the sample 300. At the first time, it can be seen in the image that a wave front of the heat wave emanating from the element 302 is still confined in the first and second layers 304, 306, and has not yet reached the third and fourth layers. Referring now solely to FIG. 6B, the second thermal image 604 is a thermal image taken at a second time subsequent to the first time. At the second time, it can be seen that the wave front of the heat wave has entered the third and fourth layers 308, 310. Referring now solely to FIG. 6C, the third thermal image 606 is a thermal image taken at a third time subsequent to the second time. At the third time, the wave front has further expanded into the layers 304-310.

The thermal images can be received by the logging component 118 and stored in the data store 117 as thermal images 124. The analysis component 120 can then compute temperatures of the second location in the sample 102 based upon the thermal images. For example, the analysis component 120 can determine a temperature of the second location in the sample 102 at a first time based upon a pixel value of a pixel in a first thermal image taken at the first time, wherein the pixel is representative of the second location. These temperature values, computed from the thermal images 124, can be included in the temperature data 122. In other embodiments, the second temperature sensing device 108 can be or include a thermocouple positioned at the second location in the sample. In such embodiments, the logging component 118 can receive a signal from the thermocouple (e.g., a signal that is indicative of a temperature-dependent resistance of the thermocouple) and can compute a temperature of the second location based upon the signal. The computed temperature of the second location of the sample 102 can be included in the temperature data 122.

The analysis component 120 can determine, based upon the computed temperature values of the second location in the sample 102, a time at which a heat wave emanating from the heating element 104 through the sample 102 has reached the second location. By way of example, the analysis component 120 can determine that the heat wave has reached the second location based upon a temperature change of the second location (e.g., as measured relative to a temperature of the second location prior to or at the start of heating of the sample by the heating element 104) exceeding a threshold amount. In exemplary embodiments, the analysis component 120 can determine that the heat wave has reached the second location based upon the temperature change exceeding 0.1 C, 0.5 C, or 1.0 C.

Accordingly, the analysis component 120 can determine that an earliest time for which a temperature change of the second location has exceeded the threshold amount is a time at which the heat wave reached the second location.

Responsive to determining the time at which the heat wave reached the second location, the analysis component 120 can determine whether a computed thermal conductivity value pertains to the second location. For example, a computed thermal conductivity value can be computed based upon a plurality of temperatures of a first location over a period of time. If the analysis component 120 determines that the heat wave has reached the second location prior to the beginning of the period of time, the analysis component 120 outputs an indication that the thermal conductivity value pertains to the second location. The analysis component 120 can then store the thermal conductivity value and an associated indication of a location or portion of the sample 102 to which the thermal conductivity value pertains as thermal characteristic data 126. The computing system 110 can further be configured to display these thermal characteristic data 126 (or temperature data 122 or thermal images 124) on the display 116 for review by an analyst.

It is to be understood that a thermal conductivity value may not be representative of a thermal conductivity of a single portion of the sample 102 in isolation. For example, and referring once again to FIG. 3, a thermal conductivity value can be computed based upon temperatures of the sample 300 after the heat wave emitted by the heating element 302 has already reached the third layer 308. In such a case, the computed thermal conductivity will be a thermal conductivity of the two-layer system comprised by the first layer 304 and the third layer 308, rather than the thermal conductivity of the third layer 308 only. Accordingly, as used herein, a thermal conductivity value pertains to a location of the sample 104 if the thermal conductivity is representative of a portion of the sample that includes the location.

It will further be appreciated by those of skill in the art that a different value of thermal conductivity can be computed for each of a plurality of different time periods for which temperatures are available from the temperature sensing devices 106, 108. Accordingly, by computing a thermal conductivity value for each of a plurality of different time periods, the analysis component 120 can generate an approximate function of thermal conductivity of the sample 102 versus time.

The analysis component 120 can compute further thermal characteristics of the sample 102 based upon the following equation:

$$C_{pMixture} = \left(\frac{v_1}{v_{mixture}}\right) C_{p1} + \left(\frac{v_2}{v_{mixture}}\right) C_{p2} \quad \text{Eq. 5}$$

defined for a two-layer sample where $C_{p\,Mixture}$ is the specific heat of the two-layer system, $v_1$ is the volume of the first layer, $v_2$ is the volume of the second layer, $v_{mixture}$ is the volume of the two layers together, $C_{p1}$ is the specific heat of the first layer, and $C_{p2}$ is the specific heat of the second layer.

The analysis component 120 can further be configured to generate a profile of penetration depth of the heat wave into the sample 102 over time. For example, the analysis component 120 can compute the penetration depth according to the following equation:

$$D(t) = b\sqrt{\alpha t} \quad \text{Eq. 6}$$

where D (t) is the penetration depth of the heat wave into the sample as a function of time (measured relative to a position of the heating element 104), b is a temperature sensitivity constant, $\alpha$ is the thermal diffusivity, and t is time. A value of the temperature sensitivity constant can be determined based upon known penetration depth and thermal diffusivity values. A penetration depth can be determined based upon output of the second temperature sensing device 108, as described above (e.g., the depth of the second location when the heat wave reaches the second location). A value of the thermal diffusivity can be iteratively determined based upon Eq. 2, as described above.

The computing system 110 can further be configured to predict thermal properties of a layered heterogeneous sample. The memory 114 can include a prediction component 128. The prediction component 128 can be configured to determine an expected thermal resistance value of a multiple-layer sample based upon area, thickness, and thermal conductivities of the individual layers. In an exemplary embodiment, the prediction component 128 can receive user input that defines a proposed configuration of a multiple-layer sample. For example, the user input can indicate a material composition of each of a plurality of layers, a relative positioning of the layers (e.g., first, second, third, top, middle, bottom, etc.), a thickness of each of the layers, and a common area of the layers (i.e., an area of interface between each of the layers). The prediction component 128 can then compute a predicted thermal resistance value of the multi-layer system through the thickness of the multi-layer system (e.g., in a direction normal to the planar interfaces between the layers). In exemplary embodiments, the prediction component 128 computes a predicted thermal resistance value based upon the following equation:

$$R_{eq} = \frac{x_1}{A_1 * k_1} + \frac{x_2}{A_2 * k_2} + \ldots \frac{x_n}{A_n * k_n} \quad \text{Eq. 7}$$

where $R_{eq}$ is a predicted thermal resistance of an n-layer barrier, $x_n$ is the thickness of an nth layer, $A_n$ is the apparent area of the nth layer, and $k_n$ is the thermal conductivity of the nth layer. In various embodiments, a same value of A can be used for each layer. However, as a heat wave propagates from one layer to the next, the area of conduction of the heat wave from one layer to another is not constant. For example, and referring once again to FIGS. 6A-6C, it can be seen that as a heat wave expands from the heating element 302, an area of intersection between the wave front and each layer (or interface between layers) varies over time. Accordingly, a value of an apparent area of conduction from one layer to another can be determined experimentally or can be determined based upon a mathematical model of propagation of a wave through each layer. It will be understood from the foregoing that the apparent conductive area $A_n$ of the nth layer can vary as a function of time, and accordingly $R_{eq}$ can be a time-variant value. A value of $R_{eq}$ can be further adjusted from a value found by Eq. 7 by incorporating thermal resistances of interfaces between layers of a sample, which can be experimentally determined.

Figure 7:
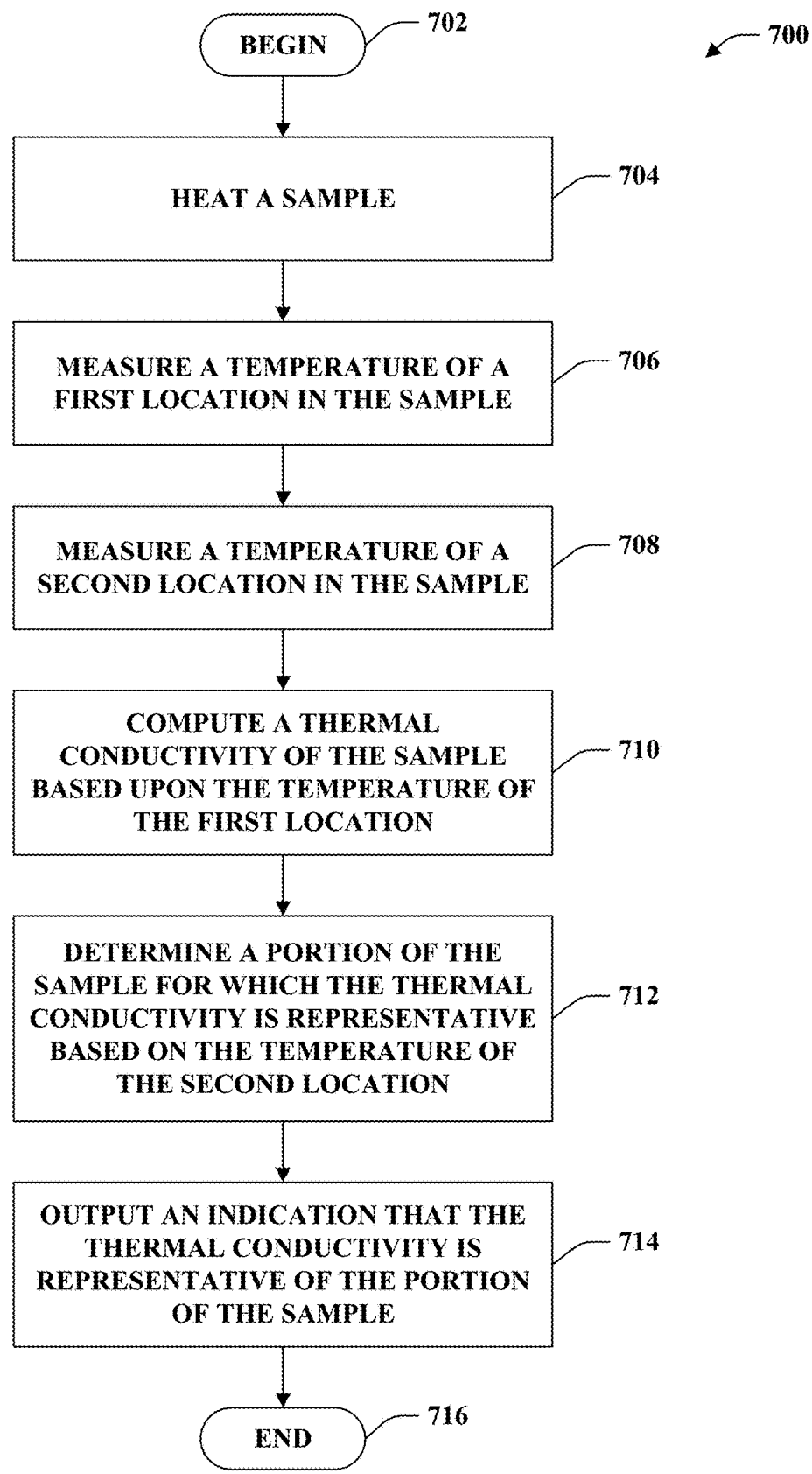
FIG. 7 is a flow diagram that illustrates an exemplary methodology for computing thermal conductivity of a heterogeneous sample.

FIG. 7 illustrates an exemplary methodology relating to computing thermal conductivities of thermally anisotropic, heterogeneous samples. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 7, a methodology 700 that facilitates determining a thermal conductivity value of a portion of an anisotropic heterogeneous sample is illustrated. The methodology 700 begins at 702, and at 704 a first location of a sample is heated. As described in greater detail above, the first location of the sample can be heated by a TPS heating element positioned at the first location. At 706, a temperature of the first location is measured at each of a plurality of times over a period of time. The temperature of the first location can be measured based upon a temperature-dependent electrical characteristic of the heating element used to heat the sample, or alternatively can be measured based upon output of some other sensor (e.g., a thermocouple placed proximal to the first location, a thermal camera that captures thermal images of the first location). At 708, a temperature of a second location in the sample is measured at a plurality of times over the same period of time as the temperature of the first location was measured at 706. The second location in the sample can be, for example, a location in a layer of the sample that is not in direct contact with the heating element.

At 710, a thermal conductivity of the sample is computed based upon the temperatures of the first location measured at 706. The thermal conductivity can be computed based upon Eqs. 1-3 as described in greater detail above. In general, for a heterogeneous sample a portion of a sample for which a computed thermal conductivity is representative is not known a priori. For instance, if a heat wave emanating from the heating element has not yet reached a layer of the sample, that layer may not yet contribute to the apparent thermal conductivity of the sample. Thus, at 712, a portion of the sample for which the thermal conductivity is representative is determined based upon the temperatures of the second location in the sample measured at 708. In a non-limiting example, the portion of the sample that is represented by the computed thermal conductivity value can be a portion of the sample extending from the location of the heating element to the second location. In other words, the portion of the sample for which the thermal conductivity is representative is a portion of the sample that includes the second location. The determination that the thermal conductivity is representative of a portion of the sample that includes the second location can be made based upon a temperature change of the second location exceeding a threshold amount. Such temperature change is indicative of a heat wave emanating from the heating element having reached the second location. At 714, an indication that the computed thermal conductivity value is representative of the determined portion of the sample can be output (e.g., on a display of a computing device for review by an analyst). The methodology 700 completes at 716.

Figure 8:
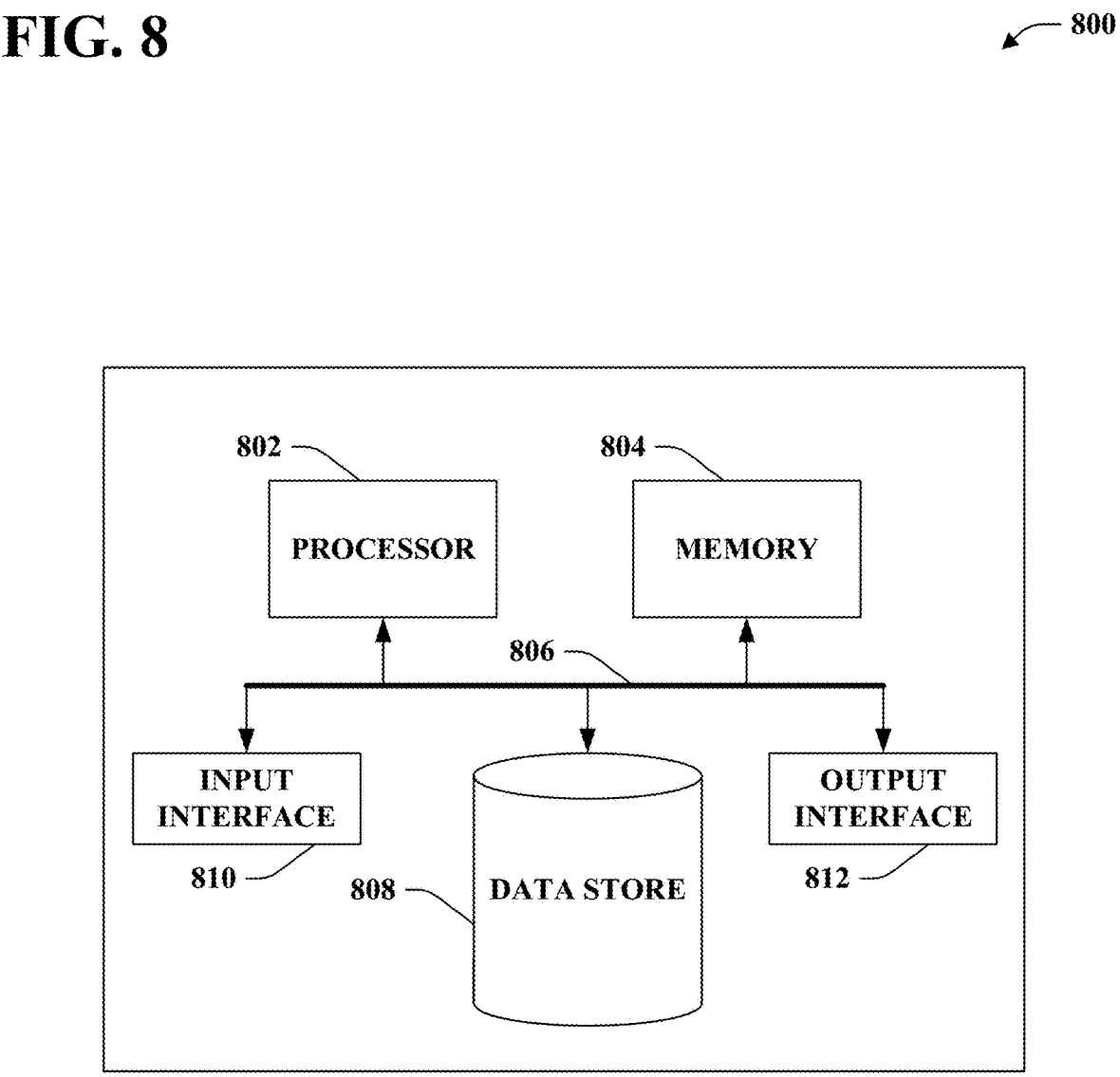
FIG. 8 is an exemplary computing system.

Referring now to FIG. 8, a high-level illustration of an exemplary computing device 800 that can be used in accordance with the systems and methodologies disclosed herein is illustrated. For instance, the computing device 800 may be used in a system that logs and analyzes temperature data to determine thermal conductivity of heterogeneous samples. By way of another example, the computing device 800 can be used in a system that displays results of analysis of thermal characteristics of a sample. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store temperature data, thermal conductivity values, thermal images, etc.

The computing device 800 additionally includes a data store 808 that is accessible by the processor 802 by way of the system bus 806. The data store 808 may include executable instructions, temperature logs, thermal conductivity values, thermal images, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc., by way of the output interface 812.

It is contemplated that the external devices that communicate with the computing device 800 via the input interface 810 and the output interface 812 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 800 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
    heating a sample at a first location in the sample;
    measuring a temperature of the sample at the first location at each of a plurality of times;
    measuring a temperature of the sample at a second location at each of the plurality of times;
    computing a thermal conductivity value associated with the sample based upon the measured temperatures for the first location in the sample;
    determining a portion of the sample of which the thermal conductivity value is representative based upon the measured temperatures of the sample at the second location; and
    outputting an indication that the thermal conductivity value is representative of the thermal conductivity of the portion of the determined portion of the sample.

2. The method of claim 1, wherein measuring the temperature of the sample at the first location is based upon an output of a thermocouple.

3. The method of claim 1, wherein measuring the temperature of the sample at the second location is based upon a thermal image output by a camera, wherein the sample is depicted in the thermal image.

4. The method of claim 1, wherein computing the thermal conductivity is based upon a change in temperature of the sample at the first location over a period of time.

5. The method of claim 1, wherein computing the thermal conductivity value comprises iteratively computing a thermal diffusivity value that is representative of at least a portion of the sample, wherein computing the thermal conductivity value is based further upon the iteratively computed thermal diffusivity value.

6. The method of claim 1, wherein determining the portion of the sample of which the thermal conductivity value is representative is based upon a change in the temperature of the sample at the second location exceeding a threshold value.

7. The method of claim 6, wherein the portion of the sample includes the second location.

8. The method of claim 1, wherein heating the sample at the first location comprises heating the sample with a transient plane source (TPS) element.

9. The method of claim 8, wherein the TPS element is a hot disk element, wherein the hot disk has a double spiral configuration.

10. The method of claim 8, wherein measuring the temperature of the sample at the first location is based upon an electrical resistance of the TPS element.

* * * * *